US008325647B2

(12) United States Patent
Kawajiri et al.

(10) Patent No.: US 8,325,647 B2
(45) Date of Patent: Dec. 4, 2012

(54) TIME-DIVISION MULTIPLEXER AND SIGNAL TRANSMISSION APPARATUS

(75) Inventors: Makoto Kawajiri, Kyoto (JP); Norihide Kinugasa, Kyoto (JP); Naohisa Hatani, Kyoto (JP)

(73) Assignee: Panasonic Corporation, Osaka (JP)

( * ) Notice: Subject to any disclaimer, the term of this patent is extended or adjusted under 35 U.S.C. 154(b) by 293 days.

(21) Appl. No.: 12/750,232

(22) Filed: Mar. 30, 2010

(65) Prior Publication Data

US 2010/0246607 A1 Sep. 30, 2010

(30) Foreign Application Priority Data

Mar. 31, 2009 (JP) ................. 2009-086307

(51) Int. Cl.
*H04J 4/00* (2006.01)
*H04W 4/00* (2009.01)
*H04N 3/14* (2006.01)
*H04N 5/335* (2011.01)
*H04N 5/228* (2006.01)

(52) U.S. Cl. ........ 370/316; 370/307; 370/314; 348/312; 348/316; 348/222.1

(58) Field of Classification Search ................. 348/312, 348/316, 222.1; 370/211, 307, 314, 532, 370/533, 534, 535, 536, 537, 539, 541, 542, 370/916

See application file for complete search history.

(56) References Cited

U.S. PATENT DOCUMENTS

| 4,498,167 | A | 2/1985 | Bowen |
| 5,615,126 | A | 3/1997 | Deeley et al. |
| 5,898,677 | A | 4/1999 | Deeley et al. |
| 7,053,950 | B2 | 5/2006 | Kubo |

FOREIGN PATENT DOCUMENTS

| JP | 2002-064753 | 2/2002 |
| JP | 2003-008995 | 1/2003 |

*Primary Examiner* — Kwang B Yao
*Assistant Examiner* — Adam Duda
(74) *Attorney, Agent, or Firm* — McDermott Will & Emery LLP

(57) ABSTRACT

Each of n signal transition detection sections detects a transition of the signal level of at least one of a first input signal or a second input signal corresponding to the signal transition detection section. A time-division control section outputs a control pulse according to a system clock when a signal transition is detected by at least one of the n signal transition detection sections. Each of n output switching sections outputs either the first or the second input signal corresponding to the output switching section as a multiplexed signal according to the control pulse.

7 Claims, 11 Drawing Sheets

TIME-DIVISION MULTIPLEXER AND SIGNAL TRANSMISSION APPARATUS

CROSS-REFERENCE TO RELATED APPLICATION

This application claims priority to Japanese Patent Application No. 2009-086307 filed on Mar. 31, 2009, the disclosure of which including the specification, the drawings, and the claims is hereby incorporated by reference in its entirety.

BACKGROUND

The technology disclosed in this specification relates to time-division multiplexers which multiplex a plurality of signals in a time-division multiplexed manner, and to signal transmission devices including the same.

A method of multiplex transmission which multiplexes and transmits a plurality of signals in a time division multiplexed manner is known for use to reduce the number of signal lines between two circuits (i.e., the number of terminals in each circuit). For example, Patent Document 1 (Japanese Unexamined Patent Application Publication No. 2003-8995) discloses a drive unit for transferring CCD charge which includes a time-division multiplexer and a demultiplexer. This drive unit for transferring CCD charge includes a timing signal generator which provides a plurality of timing signals (a plurality of timing signals for read pulses and a plurality of timing signals for vertical transfer), and a vertical driver which outputs a plurality of vertical drive pulses for driving a vertical transfer section of a solid-state imaging device (e.g., a CCD image sensor, etc.) according to the plurality of timing signals from the timing signal generator. The time-division multiplexer and the demultiplexer are respectively provided in the timing signal generator and the vertical driver. The time-division multiplexer multiplexes, in a time division multiplexed manner, combinations of the plurality of timing signals for read pulses and the plurality of timing signals for vertical transfer, and generates a plurality of multiplexed signals, while the demultiplexer demultiplexes the plurality of multiplexed signals into respective combinations of a plurality of timing signals for read pulses and a plurality of timing signals for vertical transfer.

SUMMARY

However, the time-division multiplexer of Patent Document 1 is subject to restrictions on a timing relationship between signal transitions of input signals to be multiplexed. Specifically, upon time-division multiplexing of two input signals, if the signal level of one input signal transitions while the other input signal has been selected as a signal to be multiplexed therewith, the two input signals cannot be properly multiplexed. Thus, only input signals having a particular relationship (e.g., timing signals for read pulses and timing signals for vertical transfer) can be multiplexed, making it difficult to improve a reducing effect, due to time-division multiplexing, on the number of signal lines (i.e., the number of terminals in a circuit). For example, in cases of a drive unit for transferring CCD charge, the number of lines of timing signals for read pulses is generally less than the number of lines of timing signals for vertical transfer. In the time-division multiplexer disclosed in Patent Document 1, the number of lines of timing signals which can be multiplexed is limited by the number of lines of timing signals for read pulses, making it difficult to improve a reducing effect on the number of signal lines.

Thus, it is an object of the technology disclosed in this specification to provide a time-division multiplexer and a signal transmission device capable of relaxing restrictions on a timing relationship between signal transitions of input signals to be multiplexed.

According to one aspect of the present invention, a time-division multiplexer is a circuit which multiplexes respective combinations of n (where n is an integer more than 1) first input signals and n second input signals to generate n multiplexed signals; and includes n signal transition detection sections corresponding to respective combinations of the n first input signals and the n second input signals, and each configured to detect a transition of the signal level of at least one of the first or the second input signal of the combination corresponding thereto, a time-division control section configured to output a control pulse according to a system clock when a signal transition is detected by at least one of the n signal transition detection sections, and n output switching sections corresponding to respective combinations of the n first input signals and the n second input signals, and each configured to output either the first or the second input signal of the combination corresponding thereto as one of the multiplexed signals according to the control pulse. The aforementioned time-division multiplexer is capable of relaxing restrictions on a timing relationship between signal transitions of the input signals to be multiplexed, thus flexibility in time-division multiplexing can be improved.

In addition, the control pulse may include two types of control pulses, one of which is a first control pulse output in synchronization with the system clock, and the other of which is a second control pulse output after the first control pulse; and the n output switching sections may each output the first input signal corresponding thereto as the one of the multiplexed signals in a period during which the first control pulse is output, and output the second input signal corresponding thereto as the one of the multiplexed signals in a period during which the second control pulse is output.

Alternatively, the time-division multiplexer may further include a timing generation section; the time-division control section may output a permit pulse and the control pulse according to the system clock when a signal transition is detected by at least one of the n signal transition detection sections; the timing generation section may output a frequency-multiplied clock having a higher frequency than that of the system clock as a timing clock in a period during which the permit pulse is output; and the n output switching sections may each include a selector configured to select the first input signal corresponding to the output switching section in a period during which the control pulse is not output, and to select the second input signal corresponding to the output switching section in a period during which the control pulse is output, and a flip-flop configured to load the input signal selected by the selector in synchronization with the timing clock, and to output the loaded signal as the one of the multiplexed signals. With such a configuration, a glitch or a hazard occurred in the time-division multiplexer can be prevented from affecting the demultiplexer.

Moreover, the time-division multiplexer may further include a decode-clock generation section; the time-division control section may output a permit pulse and the one or more control pulses according to the system clock when a signal transition is detected by at least one of the n signal transition detection sections; the decode-clock generation section may generate a decode clock used for demultiplexing the n multiplexed signals according to definition clocks corresponding to the system clock in a period during which the permit pulse is output.

Furthermore, the time-division multiplexer may further include a clock generation section configured to adjust the phase of the system clock and to output the resultant clocks as the definition clocks. Use of such a configuration allows the phase of the decode clock generated in the decode-clock generation section to be adjusted. In addition, the amount of phase adjustment of the decode clock may be determined considering wiring patterns on the package substrates and delay times due to inter-chip connections.

DETAILED DESCRIPTION

Figure 1:
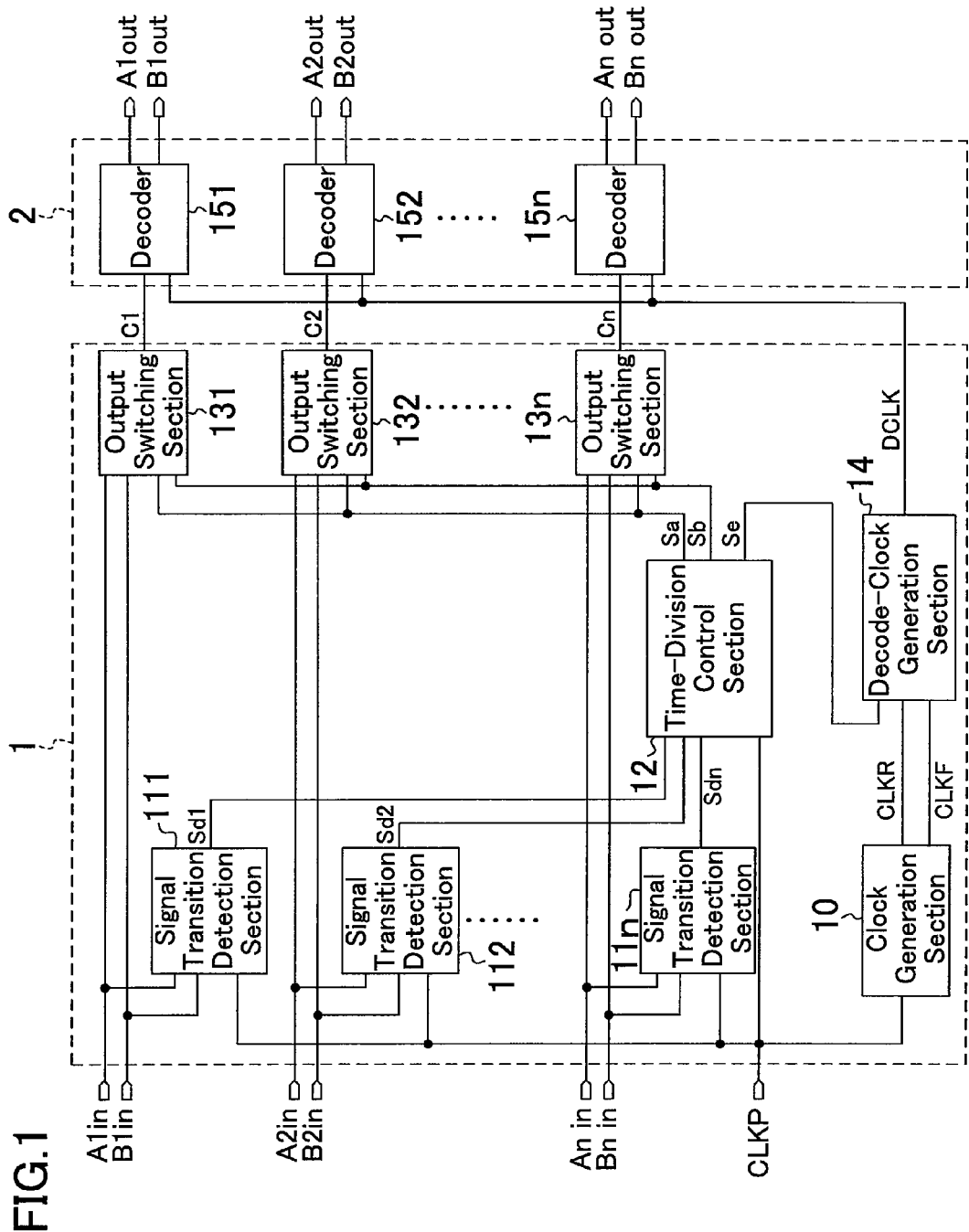
FIG. 1 is a diagram illustrating an example configuration of a signal transmission device according to the first embodiment.

Example embodiments of the present invention will be described below in detail with reference to the drawings, in which like reference characters indicate the same or similar components, and the explanation thereof will not be repeated.

First Embodiment

FIG. 1 illustrates an example configuration of a signal transmission device according to the first embodiment. The signal transmission device includes a time-division multiplexer 1, which multiplexes respective combinations of n (where n is an integer more than 1) first input signals A1in, A2in, ..., and Anin, and n second input signals B1in, B2in, ..., and Bnin to generate n multiplexed signals C1, C2, ..., and Cn, and a demultiplexer 2, which demultiplexes the n multiplexed signals C1, C2, ..., and Cn into combinations of n first output signals A1out, A2out, ..., and Anout, and n second output signals B1out, B2out, ..., and Bnout.

[Time-Division Multiplexer]

The time-division multiplexer 1 includes a clock generation section 10, n signal transition detection sections 111, 112, ..., and 11n, a time-division control section 12, n output switching sections 131, 132, ..., and 13n, and a decode-clock generation section 14. The demultiplexer 2 includes n decoders 151, 152, ..., and 15n.

The clock generation section 10 adjusts the phase of a system clock CLKP, and outputs a phase-adjusted system clock as definition clocks (in this case, a rising-edge definition clock CLKR to define a rising edge of a decode clock DCLK, and a falling-edge definition clock CLKF to define a falling edge of the decode clock DCLK). For example, the clock generation section 10 generates the rising-edge definition clock CLKR by delaying the system clock CLKP by a predetermined delay time (e.g., a half-period of the system clock CLKP), and generates the falling-edge definition clock CLKF by inverting the rising-edge definition clock CLKR.

The n signal transition detection sections 111, 112, ..., and 11n correspond to respective combinations of the n first input signals A1in, A2in, ..., and Anin, and the n second input signals B1in, B2in, ..., and Bnin, and output detection pulses Sd1, Sd2, ..., and Sdn when detecting a transition of the signal level of at least one of the first or the second input signal of the combination corresponding thereto.

The time-division control section 12 outputs control pulses (in this case, control pulses Sa and Sb) and a permit pulse Se according to the system clock CLKP when a signal transition is detected by at least one of the signal transition detection sections 111, 112, ..., and 11n (i.e., at least one of the detection pulses Sd1, Sd2, ..., or Sdn is output).

The n output switching sections 131, 132, ..., and 13n correspond to respective combinations of the n first input signals A1in, A2in, ..., and Anin, and the n second input signals B1in, B2in, ..., and Bnin, and each outputs either the first or the second input signal of the combination corresponding thereto as one of the multiplexed signals C1, C2, ..., and Cn according to the control pulses (in this case, the control pulses Sa and Sb).

The decode-clock generation section 14 generates a decode clock DCLK according to the definition clocks (in this case, the rising-edge definition clock CLKR and the falling-edge definition clock CLKF) in a period during which the permit pulse Se is output (e.g., a period during which the permit pulse Se is at a high level).

[Signal Transition Detection Section]

Figure 2:
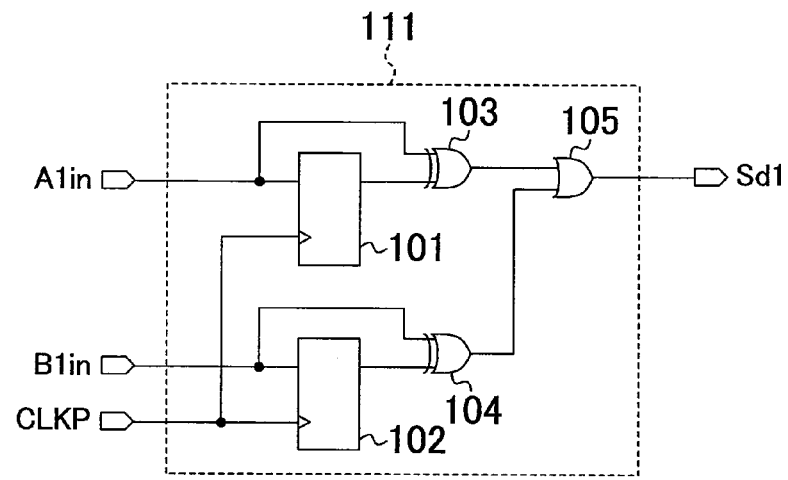
FIG. 2 is a diagram illustrating an example configuration of a signal transition detection section shown in FIG. 1.

FIG. 2 illustrates an example configuration of the signal transition detection section 111 shown in FIG. 1. Note that the configurations of the signal transition detection sections 112, ..., and 11n are similar to the configuration of the signal transition detection section 111, and thus the explanation thereof will be omitted. The signal transition detection section 111 includes flip-flops 101 and 102, XOR circuits 103 and 104, and an OR circuit 105. The flip-flops 101 and 102 respectively load the first and the second input signals A1in and B1in in synchronization with a rising edge of the system clock CLKP. The XOR circuit 103 outputs a result of a logical exclusive-OR between the first input signal A1in and the normal (non-inverted) output signal of the flip-flop 101, while the XOR circuit 104 outputs a result of a logical exclusive-OR between the second input signal B1in and the normal output signal of the flip-flop 102. The OR circuit 105 outputs a result of a logical OR of the outputs of the XOR circuits 103 and 104 as the detection pulse Sd1.

For example, if the normal output signal of the flip-flop 101 is at a low level, when the first input signal A1in transitions from low to high, the output of the XOR circuit 103 transitions to a high level, and the output of the OR circuit 105 (detection pulse Sd1) also transitions to a high level. Then, in synchronization with a rising edge of the system clock CLKP, the normal output signal of the flip-flop 101 transitions from low to high, and the output of the XOR circuit 103 and the output of the OR circuit 105 (detection pulse Sd1) transition from high to low.

[Time-Division Control Section]

Figure 3:
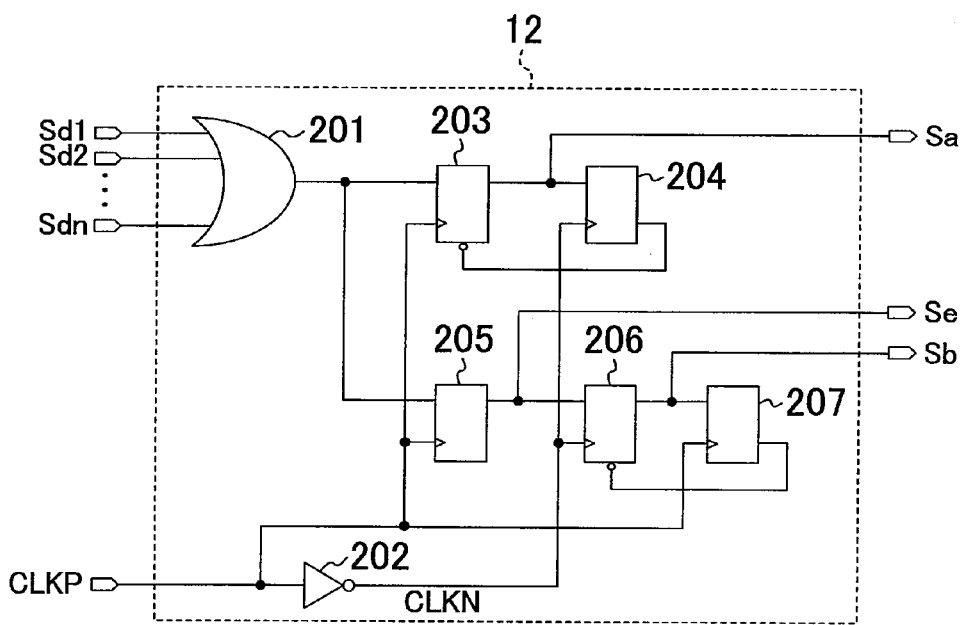
FIG. 3 is a diagram illustrating an example configuration of the time-division control section shown in FIG. 1.

FIG. 3 illustrates an example configuration of the time-division control section 12 shown in FIG. 1. The time-division control section 12 includes an OR circuit 201, an inverter 202, and flip-flops 203, 204, 205, 206, and 207. The OR circuit 201 outputs a result of a logical OR of the detection pulses Sd1, Sd2, . . . , and Sdn. The inverter 202 inverts the system clock CLKP, and outputs the result as an inverted clock CLKN. The flip-flop 203 loads the output of the OR circuit 201 in synchronization with a rising edge of the system clock CLKP. The normal output signal of the flip-flop 203 is output as the control pulse Sa. The flip-flop 204 loads the normal output signal of the flip-flop 203 (the control pulse Sa) in synchronization with a rising edge of the inverted clock CLKN. The inverted output signal of the flip-flop 204 is applied to the reset terminal of the flip-flop 203. The flip-flop 205 loads the output of the OR circuit 201 in synchronization with a rising edge of the system clock CLKP. The normal output signal of the flip-flop 205 is output as the permit pulse Se. The flip-flop 206 loads the normal output signal of the flip-flop 205 (the permit pulse Se) in synchronization with a rising edge of the inverted clock CLKN. The normal output signal of the flip-flop 206 is output as the control pulse Sb. The flip-flop 207 loads the output of the normal output signal of the flip-flop 206 (the control pulse Sb) in synchronization with a rising edge of the system clock CLKP. The inverted output signal of the flip-flop 207 is applied to the reset terminal of the flip-flop 206.

When the output of the OR circuit 201 transitions from low to high, the normal output signal of the flip-flop 203 (the control pulse Sa) transitions from low to high in synchronization with a rising edge of the system clock CLKP. Then, the inverted output signal of the flip-flop 204 transitions from high to low in synchronization with a rising edge of the inverted clock CLKN, and thus, the flip-flop 203 is reset. This causes the normal output signal of the flip-flop 203 (the control pulse Sa) to transition from high to low.

In addition, when the output of the OR circuit 201 transitions from low to high, the normal output signal of the flip-flop 205 (the permit pulse Se) transitions from low to high in synchronization with a rising edge of the system clock CLKP. Then, the normal output signal of the flip-flop 206 (the control pulse Sb) transitions from low to high in synchronization with a rising edge of the inverted clock CLKN. Thereafter, the inverted output signal of the flip-flop 207 transitions from high to low in synchronization with a rising edge of the system clock CLKP, and thus, the flip-flop 206 is reset. This causes the normal output signal of the flip-flop 206 (the control pulse Sb) to transition from high to low.

[Output Switching Section]

Figure 4:
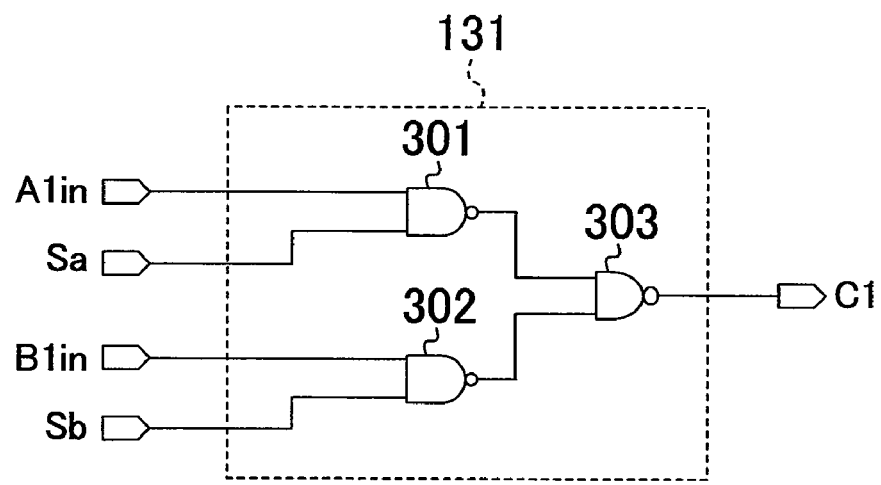
FIG. 4 is a diagram illustrating an example configuration of an output switching section shown in FIG. 1.

FIG. 4 illustrates an example configuration of the output switching section 131 shown in FIG. 1. Note that the configurations of the output switching sections 132, . . . , and 13*n* are similar to the configuration of the output switching section 131, and thus the explanation thereof will be omitted. The output switching section 131 includes NAND circuits 301, 302, and 303. The NAND circuit 301 outputs a result of a logical NAND between the first input signal A1in and the control pulse Sa; the NAND circuit 302 outputs a result of a logical NAND between the second input signal B1in and the control pulse Sb; and the NAND circuit 303 outputs a result of a logical NAND between the outputs of the NAND circuits 301 and 302. The first input signal A1in is output as the multiplexed signal C1 in a period during which the control pulse Sa is at a high level, while the second input signal B1in is output as the multiplexed signal C1 in a period during which the control pulse Sb is at a high level.

[Decode-Clock Generation Section]

Figure 5:
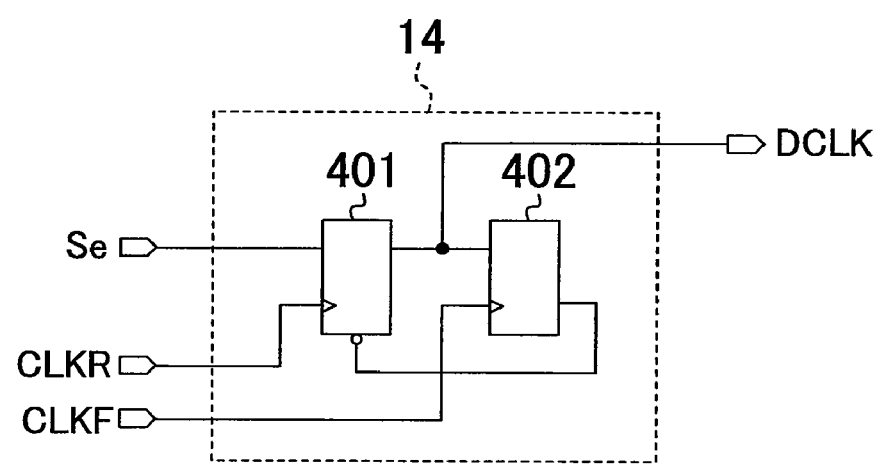
FIG. 5 is a diagram illustrating an example configuration of the decode-clock generation section shown in FIG. 1.

FIG. 5 illustrates an example configuration of the decode-clock generation section 14 shown in FIG. 1. The decode-clock generation section 14 includes flip-flops 401 and 402. The flip-flop 401 loads the permit pulse Se in synchronization with a rising edge of the rising-edge definition clock CLKR. The normal output signal of the flip-flop 401 is output as the decode clock DCLK. The flip-flop 402 loads the normal output signal of the flip-flop 401 (the decode clock DCLK) in synchronization with a rising edge of the falling-edge definition clock CLKF. The inverted output signal of the flip-flop 402 is applied to the reset terminal of the flip-flop 401.

When the permit pulse Se is at a high level, the normal output signal of the flip-flop 401 (the decode clock DCLK) transitions from low to high in synchronization with a rising edge of the rising-edge definition clock CLKR. Then, the inverted output signal of the flip-flop 402 transitions from high to low in synchronization with a rising edge of the falling-edge definition clock CLKF, and thus, the flip-flop 401 is reset. This causes the normal output signal of the flip-flop 401 (the decode clock DCLK) to transition from high to low.

[Time-Division Multiplexing Operation]

Next, referring to FIGS. 6 and 7, operation by the time-division multiplexer 1 shown in FIG. 1 will be described. Here, operation upon signal transitions of the first and the second input signals A1in and B1in will be described as an example.

Figure 6:
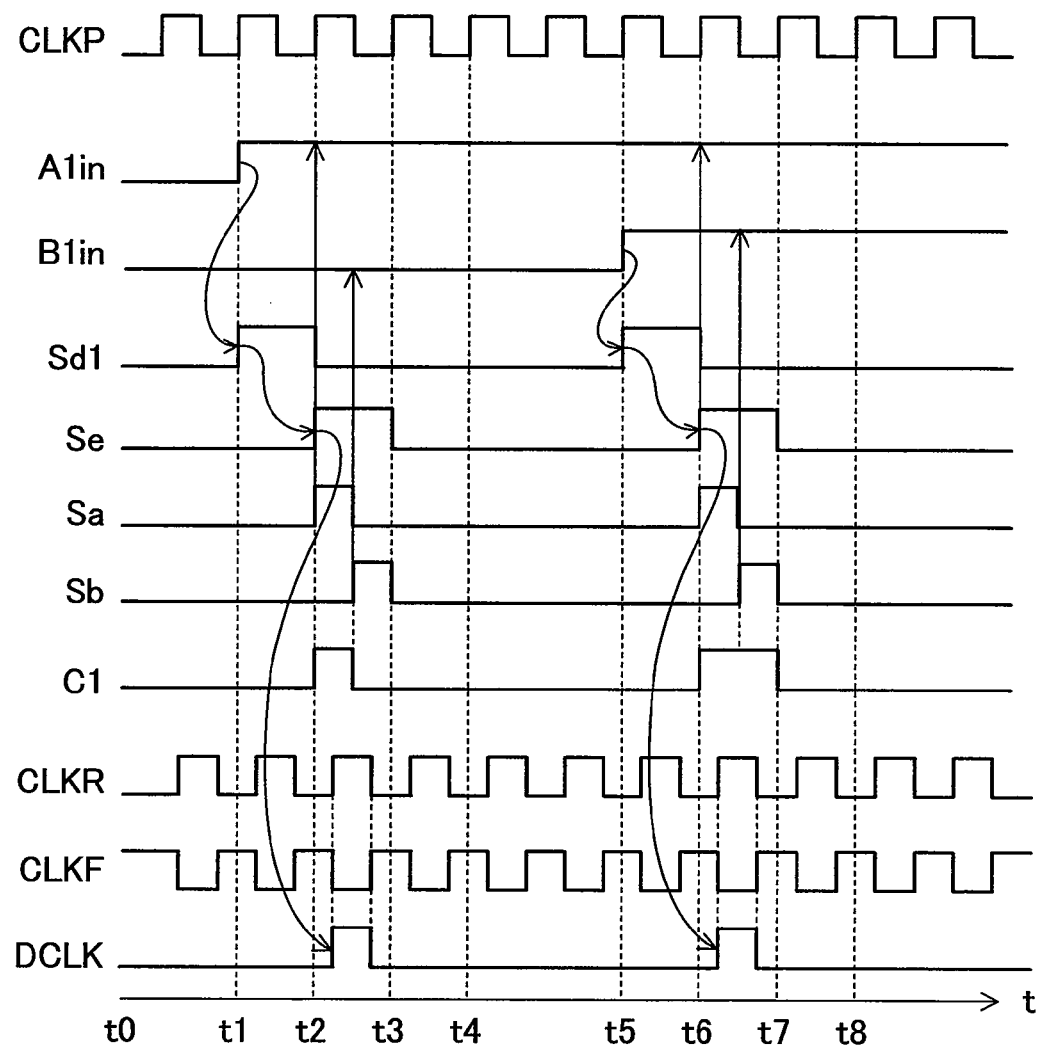
FIG. 6 is a diagram for illustrating an operation of the multiplexer shown in FIG. 1.

If the signal transitions of the first and the second input signals A1in and B1in are not coincident with each other as shown in FIG. 6, the signal transition detection section 111 drives, at time t1, the detection pulse Sd1 to the high level according to a signal transition of the first input signal A1in.

At time t2, since the detection pulse Sd1 is at the high level, the time-division control section 12 drives the control pulse Sa and the permit pulse Se to the high level in synchronization with a rising edge of the system clock CLKP. This causes the output switching section 131 to output the first input signal A1in as the multiplexed signal C1 (i.e., the multiplexed signal C1 is driven to the high level). Then, when a half-period of the system clock CLKP has elapsed after the control pulse Sa and the permit pulse Se were driven to the high level, the time-division control section 12 drives the control pulse Sa to the low level, and the control pulse Sb to the high level. This causes the output switching section 131 to output the second input signal B1in as the multiplexed signal C1 (i.e., the multiplexed signal C1 is driven to the low level). Next, when one period of the system clock CLKP has elapsed after the control pulse Sa and the permit pulse Se were driven to the high level (i.e., at time t3), the time-division control section 12 drives the permit pulse Se and the control pulse Sb to the low level. This causes the output switching section 131 to stop outputting the multiplexed signal C1 (i.e., the multiplexed signal C1 is driven to the low level).

Thereafter, at time t5, the signal transition detection section 111 outputs the detection pulse Sd1 according to a signal transition of the second input signal B1in. Then, operation similar to that in the period from t1 to t4 is performed in the period from t5 to t8. According to this, the first input signal A1in is output as the multiplexed signal C1 (i.e., the multiplexed signal C1 is driven to the high level) in a period during which the control pulse Sa is at a high level, and the second input signal B1in is output as the multiplexed signal C1 (i.e., the multiplexed signal C1 is driven to the high level) in a period during which the control pulse Sb is at a high level.

In addition, the decode-clock generation section 14 generates the decode clock DCLK according to the rising-edge definition clock CLKR and the falling-edge definition clock CLKF in a period during which the permit pulse Se is at the high level (the period from t2 to t3, and the period from t6 to t7), and stops generating the decode clock DCLK in a period during which the permit pulse Se is at the low level.

Figure 7:
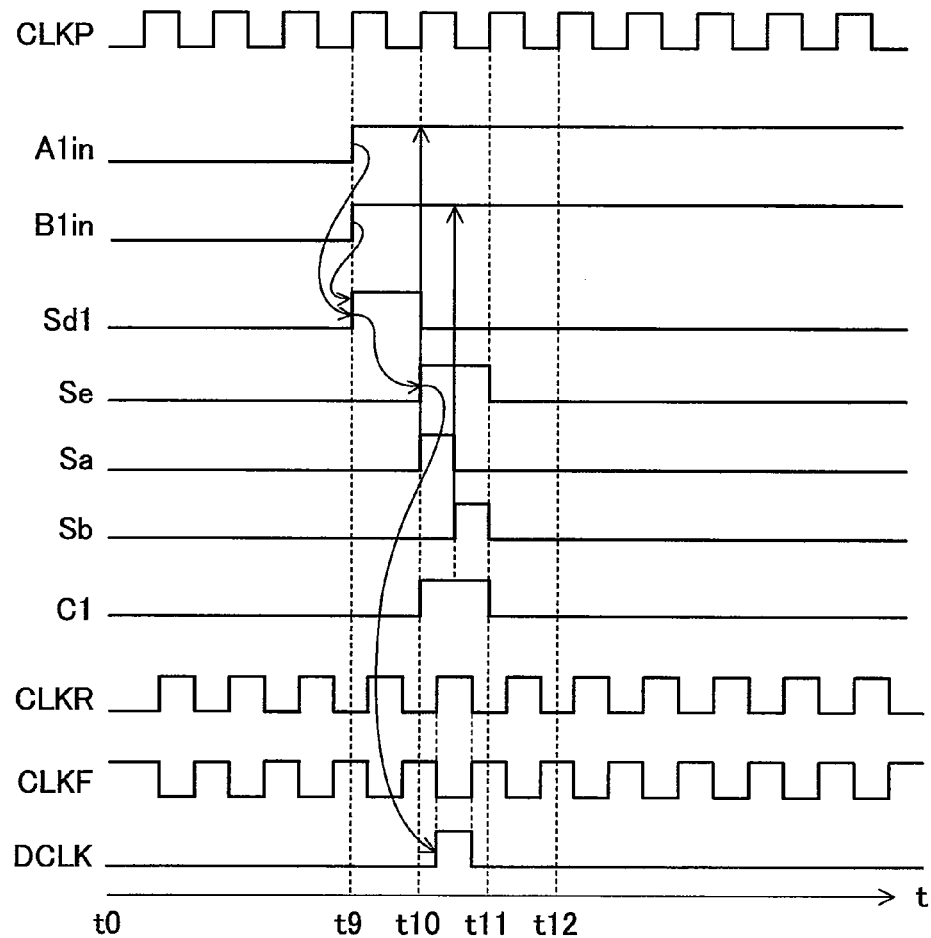
FIG. 7 is a diagram for illustrating another operation of the multiplexer shown in FIG. 1.

If the signal transitions of the first and the second input signals A1in and B1in are coincident with each other as shown in FIG. 7, the signal transition detection section 111 outputs, at time t9, the detection pulse Sd1 according to the signal transitions of the first and the second input signals A1in and B1in. Then, operation similar to that in the period from t1 to t4 of FIG. 6 is performed in the period from t9 to t12.

In this way, regardless of a timing relationship between signal transitions of a first and a second input signals, the first and the second input signals can be time-division multiplexed in one period of the system clock CLKP.

[Demultiplexer]

Returning to FIG. 1, the demultiplexer 2 includes n decoders 151, 152, ..., and 15n. The n decoders 151, 152, ..., and 15n, respectively, correspond to the n multiplexed signals C1, C2, ..., and Cn, and demultiplexes the multiplexed signals C1, C2, ..., and Cn into combinations of first output signals A1out, A2out, ..., and Anout, and second output signals B1out, B2out, ..., and Bnout according to the decode clock DCLK. For example, the decoder 151 loads the multiplexed signal C1 in synchronization with each of a rising edge and a falling edge of the decode clock DCLK, and outputs the multiplexed signal C1 loaded in synchronization with a rising edge of the decode clock DCLK as the first output signal A1out, and outputs the multiplexed signal C1 loaded in synchronization with a falling edge of the decode clock DCLK as the second output signal B1out.

[Decoder]

Figure 8:
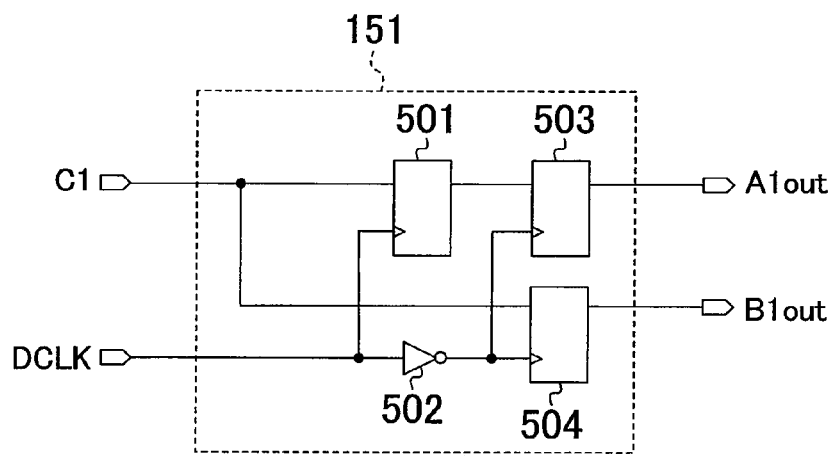
FIG. 8 is a diagram illustrating an example configuration of the decoder shown in FIG. 1.

FIG. 8 illustrates an example configuration of the decoder 151 shown in FIG. 1. Note that the configurations of the decoders 152, ..., and 15n are similar to the configuration of the decoder 151, and thus the explanation thereof will be omitted. The decoder 151 includes flip-flops 501, 503, and 504, and an inverter 502. The flip-flop 501 loads the multiplexed signal C1 in synchronization with a rising edge of the decode clock DCLK. The inverter 502 inverts the decode clock DCLK. The flip-flop 503 loads the normal output signal of the flip-flop 501 in synchronization with a rising edge of the output of the inverter 502 (i.e., a falling edge of the decode clock DCLK). The normal output signal of the flip-flop 503 is output as the first output signal A1out. The flip-flop 504 loads the multiplexed signal C1 in synchronization with a rising edge of the output of the inverter 502. The normal output signal of the flip-flop 504 is output as the second output signal B1out.

[Demultiplexing Operation]

Next, referring to FIGS. 9 and 10, operation by the demultiplexer 2 shown in FIG. 1 will be described. In the description below, the multiplexed signal C1 is explained as a representative example.

Figure 9:
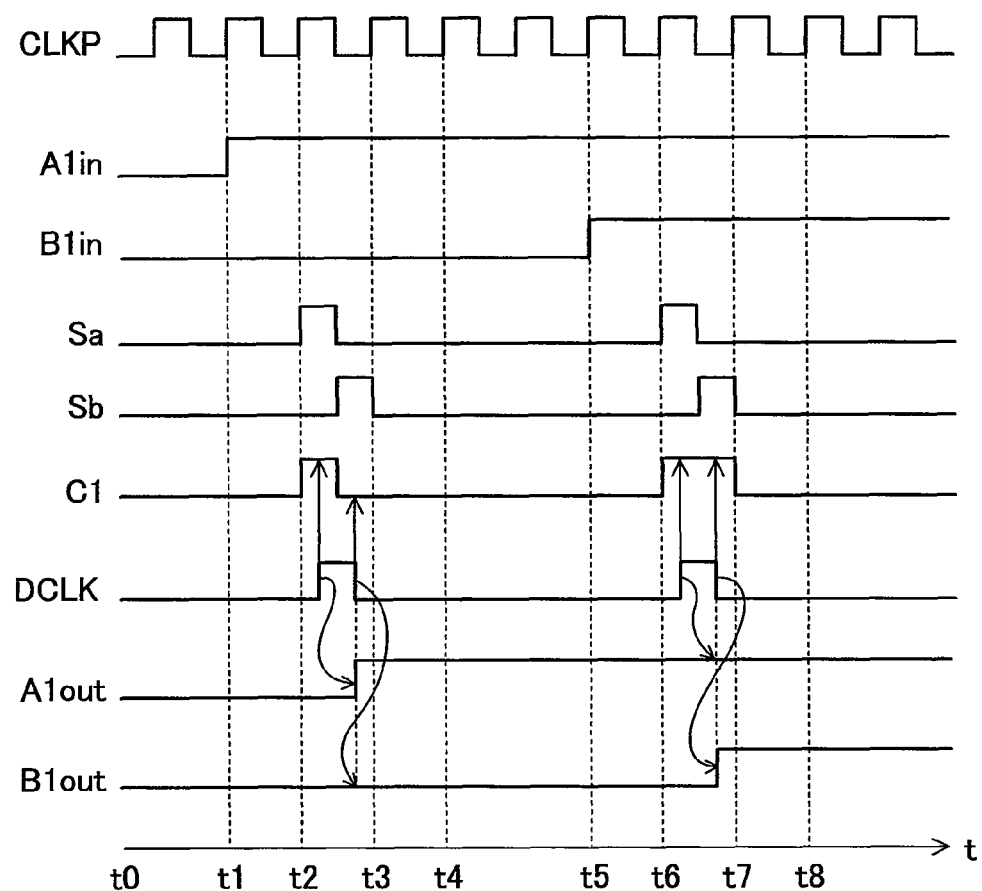
FIG. 9 is a diagram for illustrating an operation of the demultiplexer shown in FIG. 1.

If the signal transitions of the first and the second input signals A1in and B1in are not coincident with each other as shown in FIG. 9, a rising edge and a falling edge of the decode clock DCLK correspond, respectively, to the high level and the low level of the multiplexed signal C1 in the period from t2 to t3. Therefore, the decoder 151 drives the first output signal A1out to the high level and the second output signal B1out to the low level in synchronization with a falling edge of the decode clock DCLK. In the period from t6 to t7, a rising edge and a falling edge of the decode clock DCLK both correspond to the high level of the multiplexed signal C1. Therefore, the decoder 151 drives both the first and the second output signals A1out and B1out to the high level in synchronization with a falling edge of the decode clock DCLK.

Figure 10:
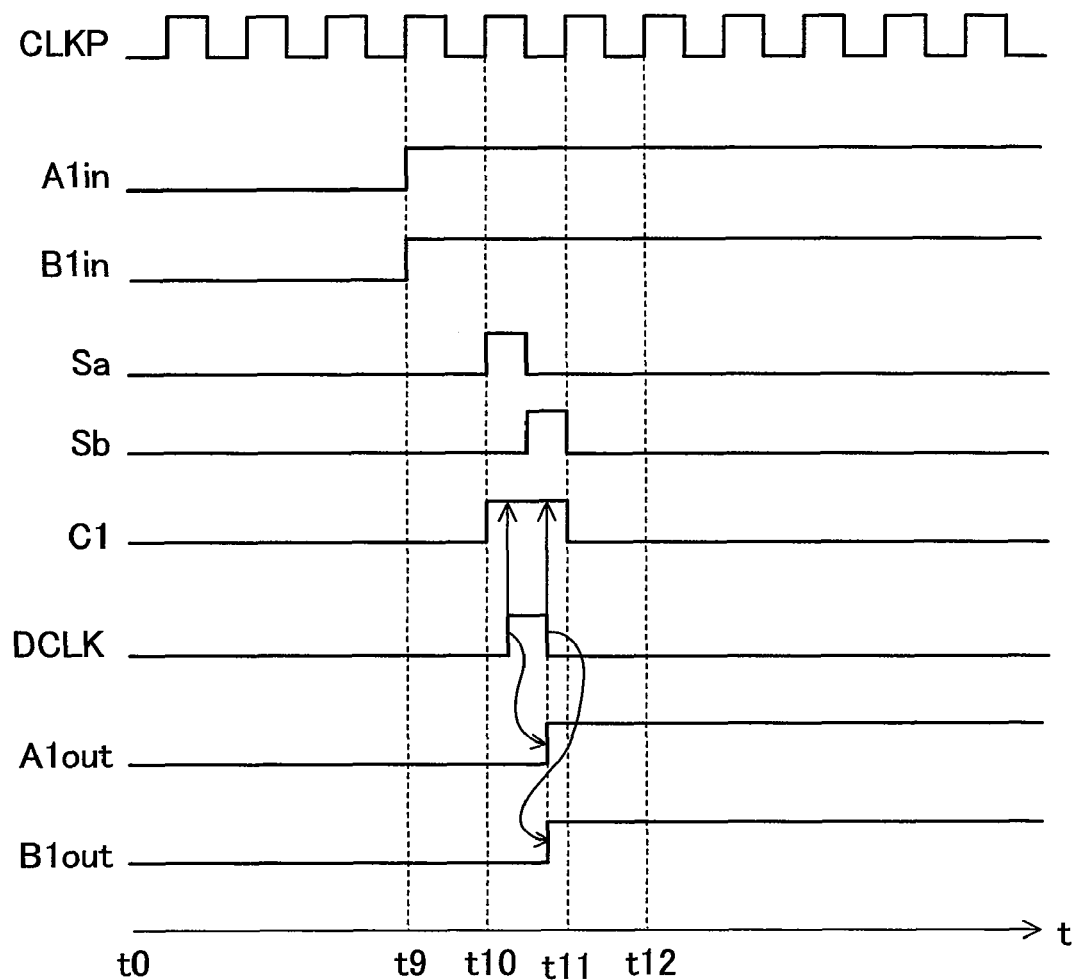
FIG. 10 is a diagram for illustrating another operation of the demultiplexer shown in FIG. 1.

If the signal transitions of the first and the second input signals A1in and B1in are coincident with each other as shown in FIG. 10, a rising edge and a falling edge of the decode clock DCLK both correspond to the high level of the multiplexed signal C1 in the period from t10 to t11. Therefore, the decoder 151 drives both the first and the second output signals A1out and B1out to the high level in synchronization with a falling edge of the decode clock DCLK.

In this way, regardless of a timing relationship between signal transitions of a first and a second input signals, a corresponding multiplexed signal can be demultiplexed into a first output signal corresponding to the first input signal, and a second output signal corresponding to the second input signal.

As described above, since restrictions on a timing relationship between signal transitions of the input signals to be multiplexed can be relaxed, flexibility in time-division multiplexing can be improved. This allows for improvement on a reducing effect, due to time-division multiplexing, on the number of signal lines (i.e., the number of terminals in the time-division multiplexer 1, and the number of terminals in the demultiplexer 2). In addition, since multiplexing operation is performed only when the signal level of an input signal transitions, current consumption of the time-division multiplexer 1 can be prevented from increasing.

Furthermore, since the clock generation section 10 adjusts the phase of the system clock CLKP, and outputs the resultant clocks as the definition clocks, the phase of the decode clock DCLK generated by the decode-clock generation section 14 can be adjusted. The amount of phase adjustment of the decode clock DCLK may be determined considering wiring patterns on the package substrates and delay times due to inter-chip connections. Note that if the definition clocks (i.e., the rising-edge definition clock CLKR and the falling-edge definition clock CLKF) are supplied from the outside of the time-division multiplexer 1 to the decode-clock generation section 14, the time-division multiplexer 1 does not need to include the clock generation section 10.

Second Embodiment

Figure 11:
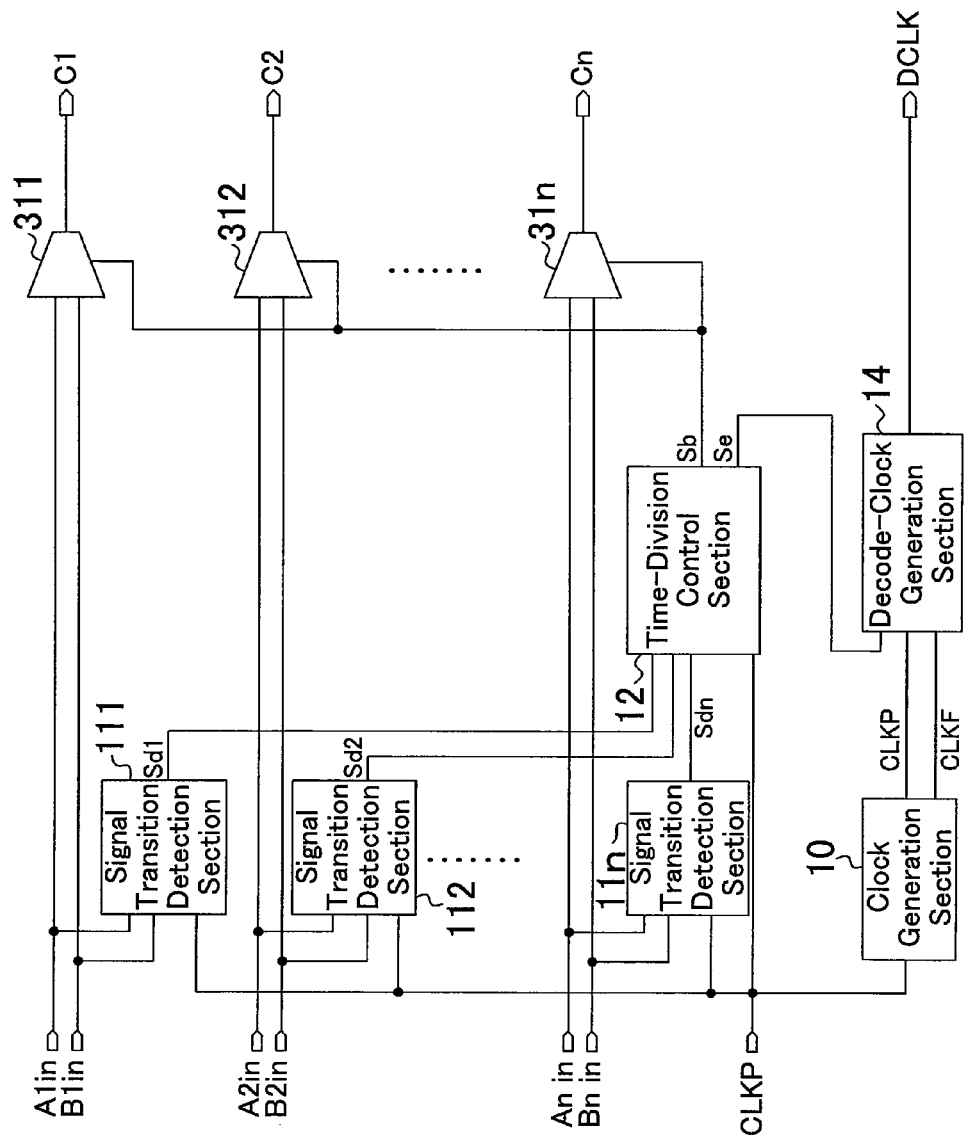
FIG. 11 is a diagram illustrating an example configuration of a multiplexer according to the second embodiment.

A signal transmission device according to the second embodiment includes a time-division multiplexer 3 shown in FIG. 11 and the demultiplexer 2 shown in FIG. 1. The time-division multiplexer 3 shown in FIG. 11 includes n selectors 311, 312, ..., and 31n instead of the output switching sections 131, 132, ..., and 13n shown in FIG. 1. The time-division control section 12 provides the control pulse (in this case, the control pulse Sb) to each of the selectors 311, 312, ..., and 31n. The other part of the configuration is similar to the corresponding part of the configuration of the time-division multiplexer 1 shown in FIG. 1. The selectors 311, 312, ..., and 31n respectively select the first input signals A1in, A2in, ..., and Anin as the multiplexed signals C1, C2, ..., and Cn in a period during which the control pulse Sb is not output, and respectively select the second input signals B1in, B2in, ..., and Bnin as the multiplexed signals C1, C2, ..., and Cn in a period during which the control pulse Sb is output.

Figure 12:
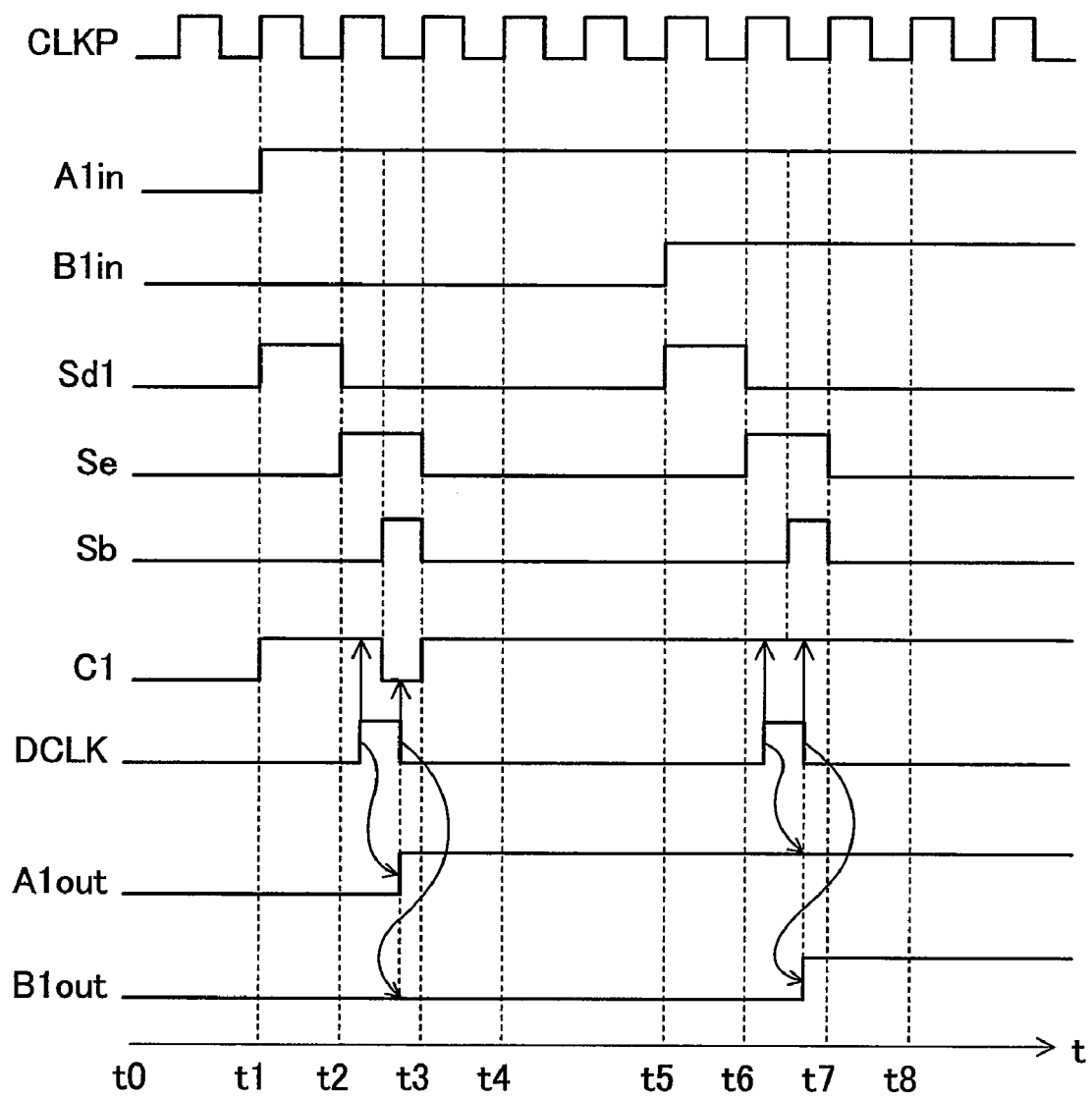
FIG. 12 is a diagram for illustrating an operation of the multiplexer shown in FIG. 11.

For example, as shown in FIG. 12, the selector 311 generates the multiplexed signal C1 from the first and the second input signals A1in and B1in according to whether the control pulse Sb is or is not output. The decoder 151 outputs the multiplexed signal C1 loaded in synchronization with a rising edge of the decode clock DCLK as the first output signal A1out, and outputs the multiplexed signal C1 loaded in synchronization with a falling edge of the decode clock DCLK as the second output signal B1out. In this way, also in a case where the output switching sections 131, 132, . . . , and 13n of FIG. 1 are respectively replaced with the selectors 311, 312, . . . , and 31n, similarly to the first embodiment, restrictions on a timing relationship between signal transitions of the input signals to be multiplexed can be relaxed.

Variation of Second Embodiment

Figure 13:
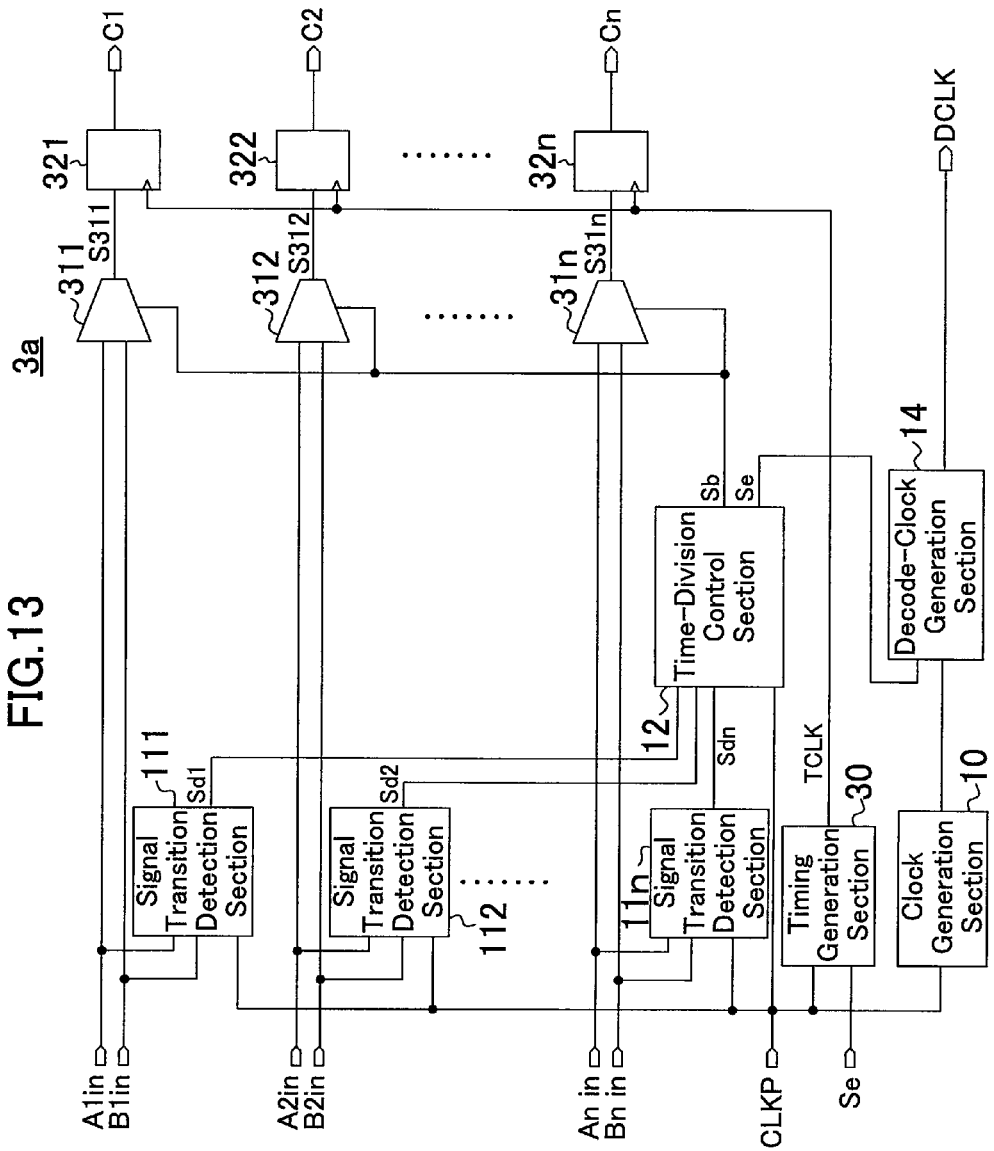
FIG. 13 is a diagram for illustrating a variation of the multiplexer shown in FIG. 11.

FIG. 13 illustrates a variation of the time-division multiplexer shown in FIG. 11. The time-division multiplexer 3a shown in FIG. 13 further includes, in addition to the components of the time-division multiplexer 3 shown in FIG. 11, a timing generation section 30 and n flip-flops 321, 322, . . . , and 32n. The timing generation section 30 generates a frequency-multiplied clock having a higher frequency than that of the system clock CLKP based on the system clock CLKP (in this case, a frequency-multiplied clock having a frequency which is twice that of the system clock CLKP), and outputs the frequency-multiplied clock as a timing clock TCLK in a period during which the permit pulse Se is output. The n selectors 311, 312, . . . , and 31n respectively select and output the first input signals A1in, A2in, . . . , and Anin as selected signals S311, S312, . . . , and S31n in a period during which the control pulse Sb is not output; and respectively select and output the second input signals B1in, B2in, . . . , and Bnin as the selected signals S311, S312, . . . , and S31n in a period during which the control pulse Sb is output. The n flip-flops 321, 322, . . . , and 32n, respectively, correspond to the n selectors 311, 312, . . . , and 31n, load the selected signals S311, S312, . . . , and S31n in synchronization with a rising edge of the timing clock TCLK, and output the selected signals S311, S312, . . . , and S31n as the multiplexed signals C1, C2, . . . , and Cn.

Figure 14:
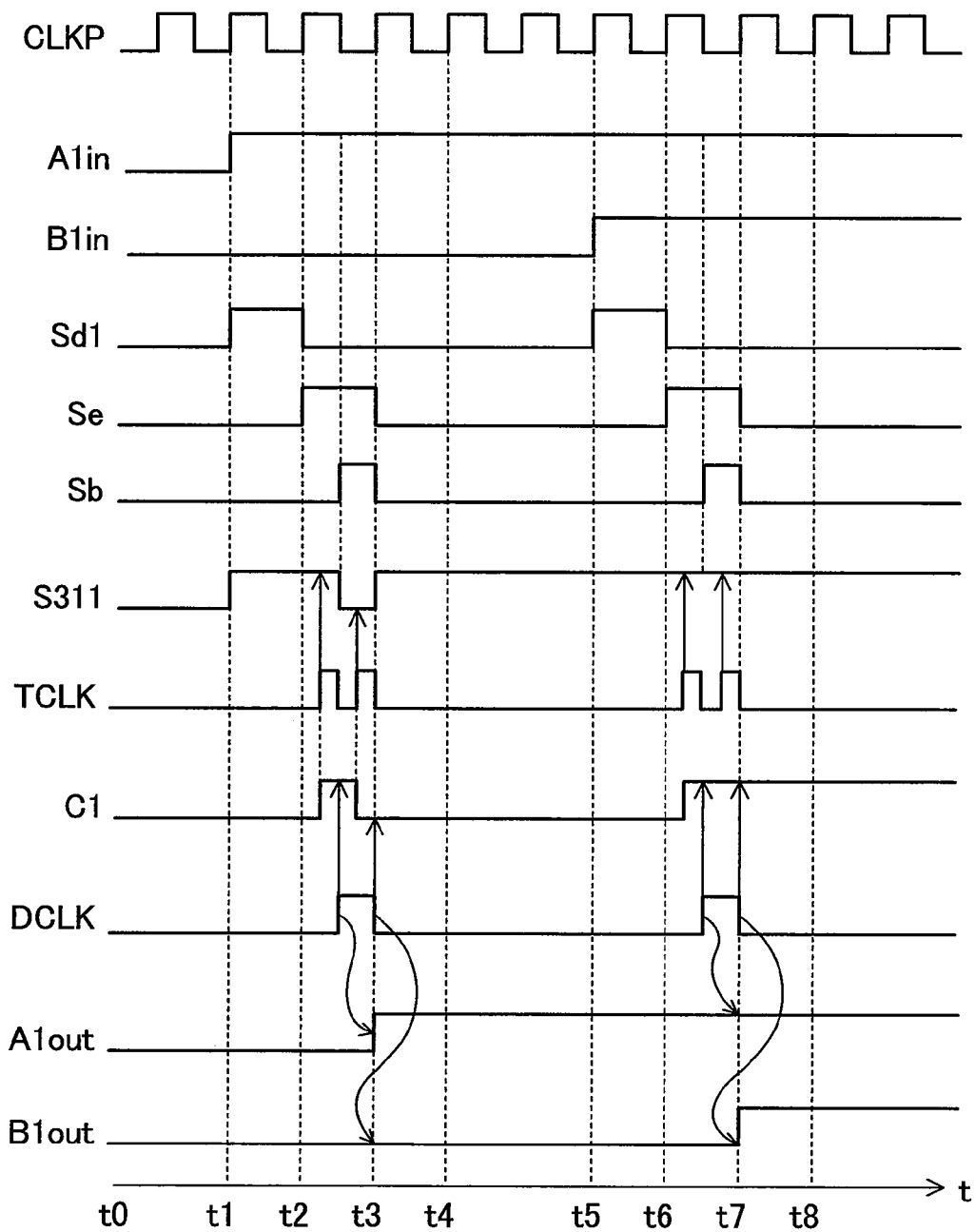
FIG. 14 is a diagram for illustrating an operation of the multiplexer shown in FIG. 13.

For example, as shown in FIG. 14, the selector 311 generates the selected signal S311 from the first and the second input signals A1in and B1in according to whether the control pulse Sb is or is not output. The flip-flop 321 loads the selected signal S311 in synchronization with a rising edge of the timing clock TCLK, and outputs the selected signal S311 as the multiplexed signal C1. With such a configuration, a glitch or a hazard occurred in the time-division multiplexer 3a can be prevented from affecting the demultiplexer 2.

(Drive Unit for Solid-State Imaging Devices)

The time-division multiplexer and the demultiplexer of each example embodiment described previously are applicable to a drive unit for solid-state imaging devices for driving a solid-state imaging device (e.g., a CCD image sensor, etc.). The drive unit for solid-state imaging devices includes a timing signal generator which provides a plurality of timing signals (a plurality of timing signals for read pulses and a plurality of timing signals for vertical transfer), and a vertical driver which outputs a plurality of vertical drive pulses for driving a vertical transfer section of a solid-state imaging device according to the plurality of timing signals from the timing signal generator. By providing the time-division multiplexer 1 (or the time-division multiplexer 3 or 3a) in the timing signal generator, and by providing the demultiplexer 2 in the vertical driver, not only combinations of the timing signals for read pulses and the timing signals for vertical transfer, but also combinations of the timing signals for read pulses, the timing signals for vertical transfer, and other signals can be multiplexed. This allows the numbers of terminals of a vertical driver and a timing signal generator to be reduced, thereby allowing the circuit size of a drive unit for solid-state imaging devices to be reduced.

As described above, the aforementioned time-division multiplexers are capable of relaxing restrictions on a timing relationship between signal transitions of input signals to be multiplexed, thus are useful for signal transmission devices, etc.

It is to be understood that the foregoing embodiments are illustrative in nature, and are not intended to limit the scope of the invention, application of the invention, or use of the invention.

What is claimed is:

1. A time-division multiplexer for multiplexing a first group of n (where n is an integer more than 1) input signals, and a second group of n input signals, thereby generating n multiplexed signals, comprising:

n signal transition detection sections, each of which is configured to receive a corresponding one of the first group of n input signals, or a corresponding one of the second group of n input signals, and to detect a signal transition of at least one of the corresponding one of the first group of n input signals, or the corresponding one of the second group of n input signals;

a time-division control section configured to output a control pulse according to a system clock when a signal transition is detected by at least one of the n signal transition detection sections; and n output switching sections, each of which is configured to receive a corresponding one of the first group of n input signals, or a corresponding one of the second group of n input signals, and to output either the corresponding one of the first group of n input signals or the corresponding one of the second group of n input signals as one of the n multiplexed signals according to the control pulse.

2. The time-division multiplexer of claim 1, wherein
the control pulse includes two types of control pulses, one of which is a first control pulse output in synchronization with the system clock, and the other of which is a second control pulse output after the first control pulse, and
the n output switching sections each outputs the one of the first group of n input signals coupled thereto as the one of the n multiplexed signals in a period during which the first control pulse is output, and outputs the one of the second group of n input signals coupled thereto as the one of the n multiplexed signals in a period during which the second control pulse is output.

3. The time-division multiplexer of claim 1, wherein the n output switching sections each includes a selector configured to select the one of the first group of n input signals coupled to the n output switching section as the one of the n multiplexed signals in a period during which the control pulse is not output, and to select the one of the second group of n input signals coupled to the n output switching section as the one of the n multiplexed signals in a period during which the control pulse is output.

4. The time-division multiplexer of claim 1, further comprising:
a timing generation section,
wherein
the time-division control section outputs a permit pulse and the control pulse according to the system clock when a signal transition is detected by at least one of the n signal transition detection sections,
the timing generation section outputs a frequency-multiplied clock having a higher frequency than that of the system clock as a timing clock in a period during which the permit pulse is output, and the n output switching sections each includes:

a selector configured to select the one of the first group of n input signals coupled to the n output switching section in a period during which the control pulse is not output, and to select the one of the second group of n input signals coupled to the n output switching section in a period during which the control pulse is output, and a flip-flop configured to load an input signal selected by the selector in synchronization with the timing clock, and to output the loaded input signal as the one of the n multiplexed signals.

5. The time-division multiplexer of claim 1, further comprising:

a decode-clock generation section, wherein the time-division control section outputs a permit pulse and the control pulse according to the system clock when a signal transition is detected by at least one of the n signal transition detection sections, and the decode-clock generation section generates a decode clock used for demultiplexing the n multiplexed signals according to definition clocks corresponding to the system clock in a period during which the permit pulse is output.

6. The time-division multiplexer of claim 5, further comprising:

a clock generation section configured to adjust a phase of the system clock and to output resultant clocks as the definition clocks.

7. A signal transmission apparatus, comprising:

a time-division multiplexer for multiplexing a first group of n (where n is an integer more than 1) input signals, and a second group of n input signals, thereby generating n multiplexed signals, comprising:

n signal transition detection sections, each of which is configured to receive a corresponding one of the first group of n input signals, or a corresponding one of the second group of n input signals, and to detect a signal transition of at least one of the corresponding one of the first group of n input signals, or the corresponding one of the second group of n input signals;

a time-division control section configured to output a control pulse according to a system clock when a signal transition is detected by at least one of the n signal transition detection sections; and n output switching sections, each of which is configured to receive a corresponding one of the first group of n input signals, or a corresponding one of the second group of n input signals, and to output either the corresponding one of the first group of n input signals or the corresponding one of the second group of n input signals as one of the n multiplexed signals according to the control pulse; and a decode-clock generation section;

a demultiplexer configured to demultiplex the n multiplexed signals generated by the time-division multiplexer into n first output signals and n second output signals according to a decode clock, wherein the time-division control section outputs a permit pulse and the control pulse according to the system clock when a signal transition is detected by at least one of the n signal transition detection sections, and the decode-clock generation section generates the decode clock used for demultiplexing the n multiplexed signals according to definition clocks corresponding to the system clock in a period during which the permit pulse is output.

* * * * *